United States Patent [19]

Mattori et al.

[11] 4,363,523

[45] Dec. 14, 1982

[54] ANTI-SKID CONTROLLER SYSTEM

[75] Inventors: Horoaki Mattori; Iwao Tateishi, both of Yamatokoriyama, Japan

[73] Assignee: Sharp Kabushiki Kaisha, Osaka, Japan

[21] Appl. No.: 892,951

[22] Filed: Apr. 3, 1978

Related U.S. Application Data

[63] Continuation of Ser. No. 482,998, Jun. 25, 1974, abandoned.

[30] Foreign Application Priority Data

Jun. 25, 1973 [JP] Japan .................................. 48-71520

[51] Int. Cl.³ .............................................. B60T 8/00
[52] U.S. Cl. ...................................... 303/92; 318/563; 340/53; 364/184
[58] Field of Search ......................... 235/307; 303/92; 318/563-565; 340/52 R, 52 B, 52 F, 53; 364/119

[56] References Cited

U.S. PATENT DOCUMENTS 3,744,851 7/1973 Burckhardt et al. .............. 303/92 X
3,825,307 7/1974 Carr et al. ............................... 303/92
3,859,513 1/1975 Chuang et al. ....................... 235/307

Primary Examiner—Reinhard J. Eisenzopf
Attorney, Agent, or Firm—Birch, Stewart, Kolasch & Birch

[57] ABSTRACT

An electronic anti-skid controller system employing a plurality of anti-skid controllers is adapted to develop state signals representative of the operational states of the individual anti-skid controllers in the form of binary signals "1" and "0". When specific combinations of the controller state signals occur indicating a tendency of the vehicle to encounter a dangerous condition, the individual controllers are respectively activated or disabled in accordance with the nature of the instantaneous combination of the state signals in order to ensure safety of the vehicle. To this end, a central control unit is provided to be responsive to the specific combination of the binary state signals.

9 Claims, 4 Drawing Figures

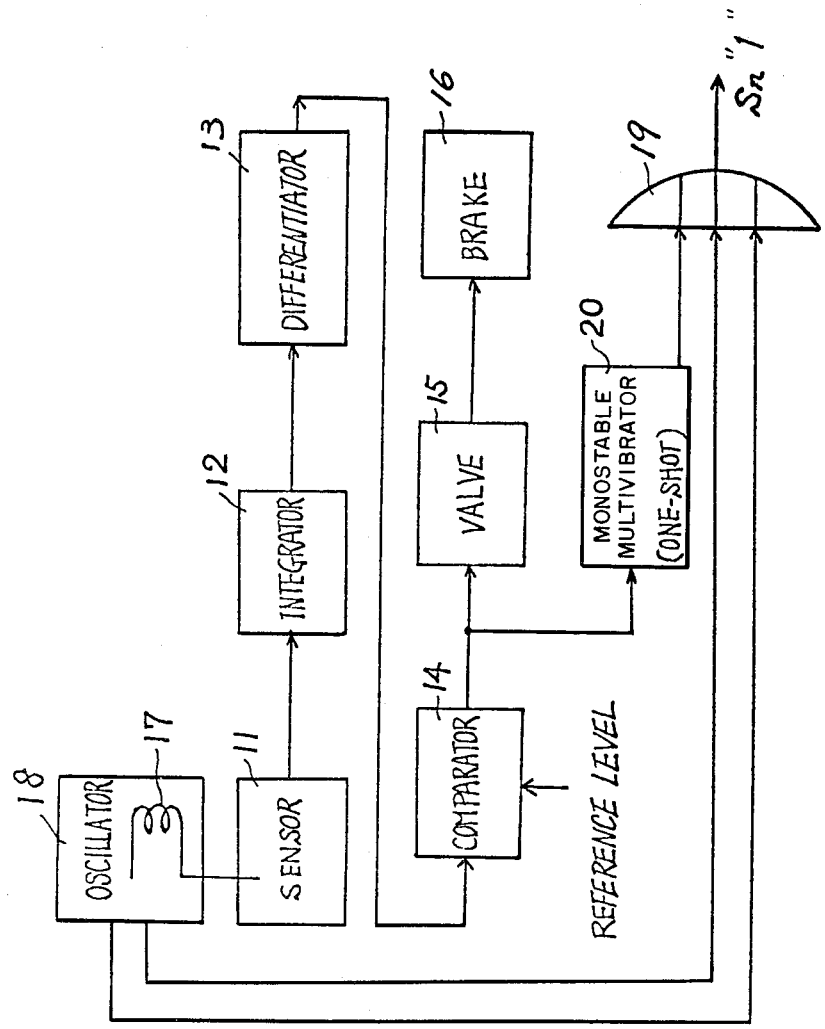

ANTI-SKID CONTROLLER SYSTEM

This application is a continuation, of copending application Ser. No. 482,998, filed on June 25, 1974, now abandoned.

This invention relates to an electronic anti-skid braking system employing a plurality of anti-skid controllers for the purpose of ensuring safety of transportation facilities.

A conventional anti-skid brake controller useful for transportation facilities such as vehicles has been proposed to reduce the brake force for avoiding a possible skid. Furthermore, such a controller may be preferably provided with means for detecting error states thereof and, if desired, disabling its performances at this time, since the safety of the transportion facilities is sacrificed when the control function of the anti-skid controller is not normal.

Moreover, stable and safe braking functions may be achieved by installation of an anti-skid controller system employing a plurality of anti-skid controllers on transportation facilities of large capacity such as tractor trailers.

The object of the invention is to provide an effective anti-skid controller system including a plurality of anti-skid controllers.

In the anti-skid controller system of the type briefly described above, there are times, for example, when only one of the anti-skid controllers is operating in the normal state and the remaining controllers are in an abnormal state. For example, when the anti-skid controller associated with a pair of the front wheels is operating normally and the remaining controllers are operating abnormally, the braking functions become worse than transportation facilities not equipped with anti-skid controllers. In this case there is a great possibility of forcing the transportation facilities into dangerous conditions if the braking system is operated in an anti-skid mode. Conversely, when the first named controller is operating abnormally and the remaining controllers are operating normally, the braking functions are not adversely influenced. In this way, in transportation facilities equipped with a plurality of electronic skid controllers, various combinations of the normal and abnormal states of the individual controllers may be classified into two groups; one having substantial adverse effects upon a vehicle during braking functions and the other having little adverse effects.

Such classification will be made possible by experimental results and various combinations of the states of the anti-skid controllers which should be avoided in order to ensure safe braking functions, will be ascertained by experimental results.

In view of the foregoing, pursuant to the preferred form of the invention, control signals effective to avoid such possible danger are derived from a central control unit in accordance with a decision whether combinations of signals obtained in response to the operational conditions of the anti-skid brake controllers have substantial (unacceptable) adverse influences upon the anti-skid brake controlling functions. The control signals are supplied to the individual controllers in a manner as to energize or disable the same to preclude the occurrence of dangerous states. The central control circuit, therefore, includes a logical circuit which creates the control signals for avoidance of possible danger in the anti-skid braking operations in accordance with occurrence of a specific combination of the controller states. It is desirable that the relation between input signals and output signals of the logical circuit is chosen to attain high degrees of safety.

The above and further objects, features and advantages of the invention will become more apparent when read in the following detailed description of the invention with reference to the accompanying drawings, in which:

FIG. 3 is a truth table for a logical circuit included in the embodiment of FIG. 2; and FIG. 4 is a schematic block diagram of an example of a state signal generator arrangement.

Figure 1:
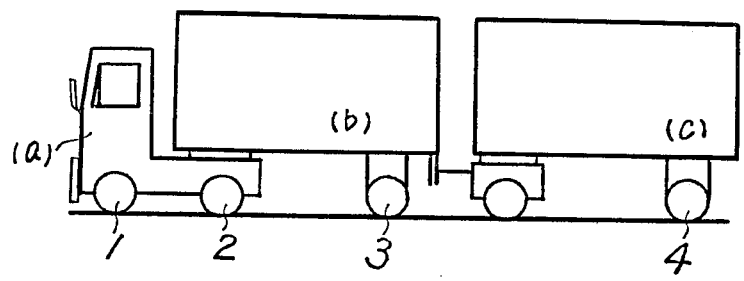
FIG. 1 is a diagrammatic showing of an example of a trailer embodying an anti-skid controller system of the present invention.

Referring now to FIG. 1, there is illustrated transportation facilities including a tractor (a) and two trailers (b) and (c). For example, four anti-skid brake controllers $A_1$, $A_2$, $A_3$ and $A_4$ (one of which will be denoted as An hereinafter where n=1 to 4) are attached to individual pairs of wheels 1, 2, 3 and 4. These controllers provide respectively state signals $S_1$, $S_2$, $S_3$ and $S_4$ (one of which will be denoted as Sn hereinafter) representative of their instantaneous states in the form of binary signals "1" and "0". It is assumed in the following description that the binary signal "0" shows that the subject anti-skid controller is in the normal state while the binary signal "1" shows that the same is in the abnormal or erroneous state. More specifically, these state signals Su in the binary notation are obtainable from a level converter which converts zero volts or certain positive volts derived from the inside of the anti-skid controller into the logical levels "0" and "1".

Figure 2:
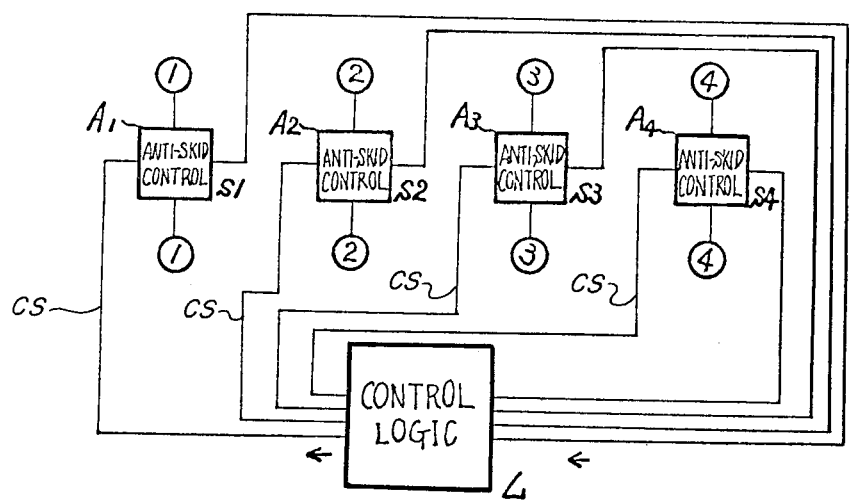
FIG. 2 is a schematic block diagram of a preferred form of the invention.

Referring to FIG. 2, a central control unit comprising a logical circuit L which upon receipt of the signals Sn provides logical outputs or control signals CS in accordance with respective combinations of the signals $S_1$, $S_2$, $S_3$ and $S_4$, the control signals CS serving to activate or disable the individual controllers in a manner to avoid danger in the anti-skid brake controlling performances.

FIG. 3 illustrates a truth table for the logical circuit L. When the control signal CS assumes the binary state "1", it causes the anti-skid controller An to be turned on or activated and, when the control signal CS assumes the binary state "0", it causes the same to be turned off or disabled.

For example, when only the anti-skid controller $A_1$ operates in the normal state and the remaining controllers $A_2$, $A_3$ and $A_4$ are in an abnormal state (corresponding to the item H of FIG. 3), the state signal $S_1$ is "0" and the other state signals $S_2$ through $S_4$ are "1" and accordingly the control signal CS assumes the binary state "0". In this instance there is the possibility of forcing the vehicle into a dangerous condition. all the anti-skid brake controllers are immediately disabled and become non-operative and the possibility of incurring the dangerous conditions is completely avoided. Thus, the vehicle may stop travelling in safety.

When only the anti-skid controller $A_1$ is abnormal and the other controllers $A_2$ through $A_4$ are normal (corresponding to the item I of FIG. 3); $S_1$="1" and $S_2$ through $S_4$="0", the control signal "1" is produced so that all the anti-skid brake controllers are activated and become operational. Under the circumstances there is no possibility of incurring the dangerous conditions when the vehicle stops running by virtue of the behavior of the anti-skid brake controllers.

Although the logical circuit L supplies the control signals CS common to all the anti-skid controllers in the preferred form, this may supply control signals CS to the respective anti-skid brake controllers or the respective groups of the anti-skid brake controllers independently of each other.

In FIG. 4, there is illustrated one way of generating the state signals Sn within the respective anti-skid brake controllers An. In the illustrated form, the state signal "1" indicative of the erroneous states of the anti-skid brake controller will develop (1) when a pick up coil for sensing wheel speed is interrupted, (2) when the same shorts and (3) when a command for brake pressure reduction is maintained for a longer period of time.

The conventional anti-skid brake controller, for example, as disclosed in U.S. Pat. No. 3,511,542, includes a sensor 11, an integrator 12, a differentiator 13, a comparator 14, a valve 15 and a brake 16. A pick up coil 17 for sensing wheel speed included within the sensor 11 forms an oscillator 18 in combination with other components. Two kinds of outputs from the oscillator 18 are applied as logical inputs to an OR gate 19, one indicating that the pick up coil is being interrupted and the other indicating that the same is shorting. The command for brake force reduction derived from the comparator 14 is supplied to an one-shot multivibrator 20 which determines whether the command period is longer than a predetermined period and, if the affirmative answer is obtained, provides a third logical input to the OR gate 19. It should be noted that other logical conditions indicative of the erroneous or abnormal states of the anti-skid controllers may be added to the OR gate 19. In this way, the state signals Sn "1" indicative of these abnormal states are developed without a considerable increase in the expenditure on the circuit elements. It will be further noted that the state signal generator arrangement discussed above is applicable to another type of the anti-skid controller as set forth in U.S. Pat. No. 3,245,727.

It is to be understood that the above-described embodiments are simply illustrative of the principles of the invention and that many embodiments may be devised without departing from the scope and spirit of the invention.

What is claimed is:

1. An anti-skid brake controller system useful for vehicles employing a plurality of anti-skid brake controllers, said system comprising; means for providing state signals representing normal and abnormal operating states of the individual anti-skid brake controllers;
   means for classifying the respective combinations of the normal and abnormal state signals into at least two groups, a first group defining dangerous braking conditions and a second group defining safe braking conditions;
   means for controlling the operational conditions of said anti-skid brake controllers in accordance with said classification by said classifying means to preclude the occurrence of said dangerous braking conditions;
   wherein said safe braking conditions include combinations of abnormal state signals of respective various anti-skid controllers which, collectively with the then existing normal state signals of the respective remaining anti-skid controllers, do not constitute dangerous braking conditions in the anti-skid mode of said brake controller system.

2. An anti-skid brake controller system useful for vehicles employing a plurality of anti-skid brake controllers, said system comprising:
   means for obtaining state signals representative of the normal and abnormal operational state of the individual anti-skid brake controllers in the form of binary notation "0" or "1", respectively;
   means for logically classifying the respective combinations of the state signals "1" and "0" into at least two groups, a first group defining dangerous braking conditions and a second group defining safe braking conditions; and
   means for generating enable signals and disable signals for the individual anti-skid brake controllers in response to, respectively, said second group and said first group to preclude the occurrence of said dangerous braking conditions;
   wherein said second group defining safe braking conditions includes abnormal state signals of various individual anti-skid brake controllers which, collectively with the then existing normal state signals of the remaining said individual controllers, do not constitute dangerous braking conditions in the anti-skid mode of said system.

3. An anti-skid brake controller system comprising:
   a plurality of anti-skid brake controllers each having a detector circuit means for generating state signals representative of the normal and abnormal operational states of said controller; and a logical circuit connected with the anti-skid brake controllers for receiving the state signals from said detector circuit means and providing control signals to the individual anti-skid brake controllers in accordance with a decision thereby as to whether an existing combination of the respective state signals defines a dangerous braking condition, said control signals being supplied to the individual anti-skid brake controllers for the purpose of disabling all of the individual anti-skid brake controllers to preclude the occurrence of said dangerous braking condition;
   wherein, said existing combination of respective state signals includes both normal and abnormal state signals only in those combinations which collectively define a dangerous braking condition such that not all combinations of state signals including respective abnormal states will result in a disabling of all said anti-skid brake controllers.

4. An anti-skid controller system as set forth in claim 3 wherein said detector circuit means for generating said state signals comprises a logical OR circuit responsive to abnormal states of said anti-skid brake controllers.

5. An anti-skid controller system as set forth in claim 4, wherein:
   said vehicle includes at least one wheel associated with and controlled by each said anti-skid brake controller and each said controller includes a wheel speed sensing coil means; and
   said detector circuit means for generating said state signals further comprises detector means connected with said wheel speed sensing coil means in a corresponding one of said anti-skid brake controllers for detecting the occurrence of abnormal operating states of said individual anti-skid brake controllers.

6. An anti-skid controller system as set forth in claim 3 wherein said logical circuit supplies control signals to all of said anti-skid brake controllers.

7. An anti-skid controller system as set forth in claim 3 wherein said logical circuit supplies control signals to the respective anti-skid brake controllers independently of each other.

8. A method for controlling an anti-skid brake controller system employing a plurality of anti-skid brake controllers, said method comprising the steps of;
- obtaining state signals representative of normal and abnormal and operational states of the individual anti-skid brake controllers;
- classifying the respective combinations of the state signals into at least two groups one group defining potentially dangerous braking conditions and the other group defining safe braking conditions;
- sensing the occurrence of said one group and said other group; and
- controlling the individual anti-skid brake controllers in accordance with said classification to preclude operation of said controllers when said one group of state signals is sensed;
- said other group including safe braking conditions defined by combinations of abnormal states of various ones of said individual anti-skid brake controllers which, collectively with the then existing normal states of the remaining said anti-skid brake controllers, do not constitute unsafe braking conditions; and
- said one group including unsafe braking conditions defined by combinations of normal states of various ones of said individual anti-skid brake controllers which, collectively with the then existing abnormal state of the remaining said anti-skid brake controllers, do not constitute safe braking conditions.

9. In an anti-skid brake control system for vehicles having a plurality of anti-skid brake control devices on said vehicle each controlling one of a like plurality of braking means and each said braking means being operable in both anti-skid and conventional modes, means for selectively enabling and disabling said anti-skid mode comprising:
- sensor means connected with each of said anti-skid brake control devices providing state signals indicative of normal and abnormal operating states of each said anti-skid device;
- logic means connected with said sensor means receiving said state signals therefrom and responsive to predetermined combinations of normal and abnormal state signals to selectively generate enabling and disabling control signals for each of said anti-skid devices; and
- means connecting said control signals to said anti-skid devices;
- said disabling control signals being generated for all said anti-skid devices in response to said predetermined combinations of normal and abnormal state signals which represent unsafe vehicle braking conditions in the anti-skid mode of said braking means; and
- said enabling control signals being generated for all said anti-skid devices for all safe braking conditions;
- said safe braking conditions including combinations of abnormal states of various ones of said individual anti-skid brake controllers which, collectively with the then existing normal states of the remaining said anti-skid brake controllers, do not constitute unsafe vehicle braking conditions in said anti-skid mode of said braking means.

* * * * *